(12) United States Patent  (10) Patent No.: US 6,655,411 B2
Sato et al.                  (45) Date of Patent:     Dec. 2, 2003

(54) POPPET-TYPE SOLENOID VALVE

(75) Inventors: Hideharu Sato, Tsukuba-gun (JP); Shinichi Yoshimura, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/004,886

(22) Filed: Dec. 7, 2001

(65) Prior Publication Data

US 2002/0079004 A1 Jun. 27, 2002

(30) Foreign Application Priority Data

Dec. 21, 2000  (JP) ......................................... 2000-389285

(51) Int. Cl.⁷ ............................................... F15B 13/044
(52) U.S. Cl. ............................... 137/625.65; 137/625.27
(58) Field of Search ......................... 137/625.27, 625.65

(56) References Cited

U.S. PATENT DOCUMENTS 4,620,565 A * 11/1986 Brown ................... 137/625.65

* cited by examiner

Primary Examiner—Gerald A. Michalsky
(74) Attorney, Agent, or Firm—Oblon, Spivak, McClelland, Maier & Neustadt, P.C.

(57) ABSTRACT

A poppet valve body for opening and closing supply and discharge valve seats by a movable core is provided in a valve chamber having the supply and discharge valve seats. The supply valve seat is formed at a valve seat body movable to approach and move away from the discharge valve seat. The valve seat body has first and second pressure receiving faces having different pressure receiving areas and on which fluid pressure from an input port acts in opposite directions and a third pressure receiving face on which fluid pressure in the valve chamber acts. The valve seat body, poppet valve body and movable core move forward to approach the discharge valve seat when the supply valve seat is closed with the poppet valve body. The valve seat body moves rearward to move away from the poppet valve body when the poppet valve body opens the supply valve seat.

6 Claims, 2 Drawing Sheets

POPPET-TYPE SOLENOID VALVE

TECHNICAL FIELD

The present invention relates to a poppet-type solenoid valve in which a large flow rate can be obtained with a small-sized solenoid valve and small power and particularly to a three-port poppet-type solenoid valve.

PRIOR ART

Because an attracting force acting on a movable core in energization is inversely proportional to the square of a stroke of the movable core in general in a solenoid used for a solenoid valve, it is effective to minimize the stroke of the movable core to obtain a large driving force with a small-sized solenoid and small power.

On the other hand, because an opening amount of a valve seat is substantially proportional to a stroke of a movable core in a poppet-type solenoid valve for opening and closing the valve seat by driving a poppet valve body by the movable core, it is necessary to maximize strokes of the movable core and the poppet valve body to control a large flow rate of fluid. However, if the stroke of the movable core is increased, an opening/closing stroke of the poppet valve body becomes large and the large flow rate of fluid can be controlled, but the attracting force of the movable core becomes small as described above. If the stroke of the movable core is reduced, the attracting force of the movable core can be increased, but the opening/closing stroke of the poppet valve body becomes small and the flow rate of fluid is reduced. Therefore, it is necessary to solve the above mutually contradictory problems to achieve the large flow rate with the small-sized solenoid and small power.

DISCLOSURE OF THE INVENTION

The present invention is intended to solve the above problems and it is a technical object of the invention to provide a poppet-type solenoid valve in which a valve seat is opened by as large an amount as possible to obtain a large flow rate while reducing a stroke of a movable core in a solenoid portion to obtain a large attracting force with the smallest possible solenoid and the smallest possible power.

It is a more concrete technical object of the invention to provide a solenoid valve in which a movable core drives a poppet valve body by a small stroke to open a supply valve seat and then the supply valve seat moves in such a direction as to further move away from the poppet valve body due to fluid pressure to increase a valve opening amount. When the movable core returns and the poppet valve body closes the supply valve seat, the supply valve seat moves due to fluid pressure to move the poppet valve body and the movable core to such positions as to open the valve by a small stroke.

To achieve the above objects, a solenoid valve of the present invention comprises: a housing including an input port, an output port, and a discharge port; a valve chamber which is formed in the housing, with which the input port and the discharge port respectively communicate through a supply valve seat and a discharge valve seat facing each other, and with which the output port communicates in a position between both the valve seats; a poppet valve body disposed in the valve chamber to open and close the supply valve seat and the discharge valve seat; and a solenoid portion including a movable core for causing the poppet valve body to carry out opening and closing operations.

The supply valve seat is formed on a valve seat body which is disposed for moving forward and rearward in such directions as to approach and move away from the discharge valve seat and which defines the valve chamber.

The valve seat body includes a supply flow path connecting the input port and the supply valve seat, first and second pressure receiving faces which have different pressure receiving areas and on which fluid pressure from the input port acts in opposite directions, and a third pressure receiving face on which fluid pressure in the valve chamber acts in the same direction as on the second pressure receiving face. The valve seat body moves forward in such a direction as to approach the discharge valve seat due to a fluid pressure operating force based on an area difference between the first and second pressure receiving faces when the supply valve seat is closed with the poppet valve body and moves rearward in such a direction as to move away from the discharge valve seat due to a fluid pressure operating force based on an area difference between the respective pressure receiving faces when the poppet valve body opens the supply valve seat.

In the solenoid valve having the above structure, when the solenoid portion is not energized, the poppet valve body closes the supply valve seat and opens the discharge valve seat. At this time, the fluid pressure from the input port acts on the first and second pressure receiving faces and the valve seat body moves forward in such a direction as to approach the discharge valve seat due to an operating force based on an area difference between the first and second pressure receiving faces. The poppet valve body and the movable core are pushed by the valve seat body and move to occupy such positions as to open the discharge valve seat by a small stroke.

If the solenoid portion is energized in this state, the poppet valve body opens the supply valve seat and closes the discharge valve seat by operation of the movable core. Therefore, the pressure fluid flows into the valve chamber from the supply valve seat and acts on the third pressure receiving face of the valve seat body. As a result, the valve seat body moves rearward in such a direction as to move away from the discharge valve seat due to the operating force based on the area difference between the respective pressure receiving faces and a gap between the supply valve seat and the poppet valve body is widened to increase an opening amount of the supply valve seat.

If energization of the solenoid portion is cancelled, the movable core returns and the poppet valve body closes the supply valve seat, opens the discharge valve seat, and opens the output port and the valve chamber to the atmosphere. Because the poppet valve body moves to a position of the supply valve seat in a rear position at this time, the discharge port opens temporarily by a large amount. Then, if the fluid pressure in the valve chamber reduces, the valve seat body moves forward toward the discharge valve seat due to the fluid pressure operating force based on the area difference between the first pressure receiving face and the second pressure receiving face. Therefore, the poppet valve body and the movable core are pushed by the valve seat body and move to occupy such positions as to open the discharge valve seat by the small stroke.

According to the invention, because the poppet valve body can be switched by a small stroke of the movable core, it is possible to generate a large attracting force required for valve opening with a small-sized solenoid. Moreover, once the poppet valve body opens the supply valve seat, the valve seat body moves with the supply valve seat due to the fluid pressure to increase the opening mount. Therefore, it is possible to switch a large flow rate of fluid by a small stroke.

According to a concrete embodiment of the invention, the valve seat body has a large-diameter portion and a small-diameter portion, the supply valve seat is formed and the third pressure receiving face facing the valve chamber is formed at the large-diameter portion, a space portion also functioning as a part of the supply flow path is formed between the large-diameter portion and the small-diameter portion, the first pressure receiving face is formed on a face on a side of the large-diameter portion facing the space portion, and the second pressure receiving face is formed on a face on a side of the small-diameter portion facing the space portion.

The large-diameter portion of the valve seat body is fitted in an inner hole formed in the housing through a sealing member and the small-diameter portion of the valve seat body is fitted for sliding through a sealing member in a small-diameter sleeve mounted in the inner hole.

In the solenoid valve of the invention, it is possible to provide an assist spring for repulsing the valve seat body toward the discharge valve seat in an assisting manner.

According to an embodiment of the invention, a spring guide in contact with the poppet valve body is movably provided around the supply valve seat in the valve seat body and a poppet spring is provided between the spring guide and the valve seat body.

According to another embodiment of the invention, a poppet guide for guiding opening and closing of the poppet valve body by sliding in the valve chamber is mounted to the poppet valve body and a poppet spring is disposed between the poppet guide and the valve seat body.

DETAILED DESCRIPTION

Figure 1:
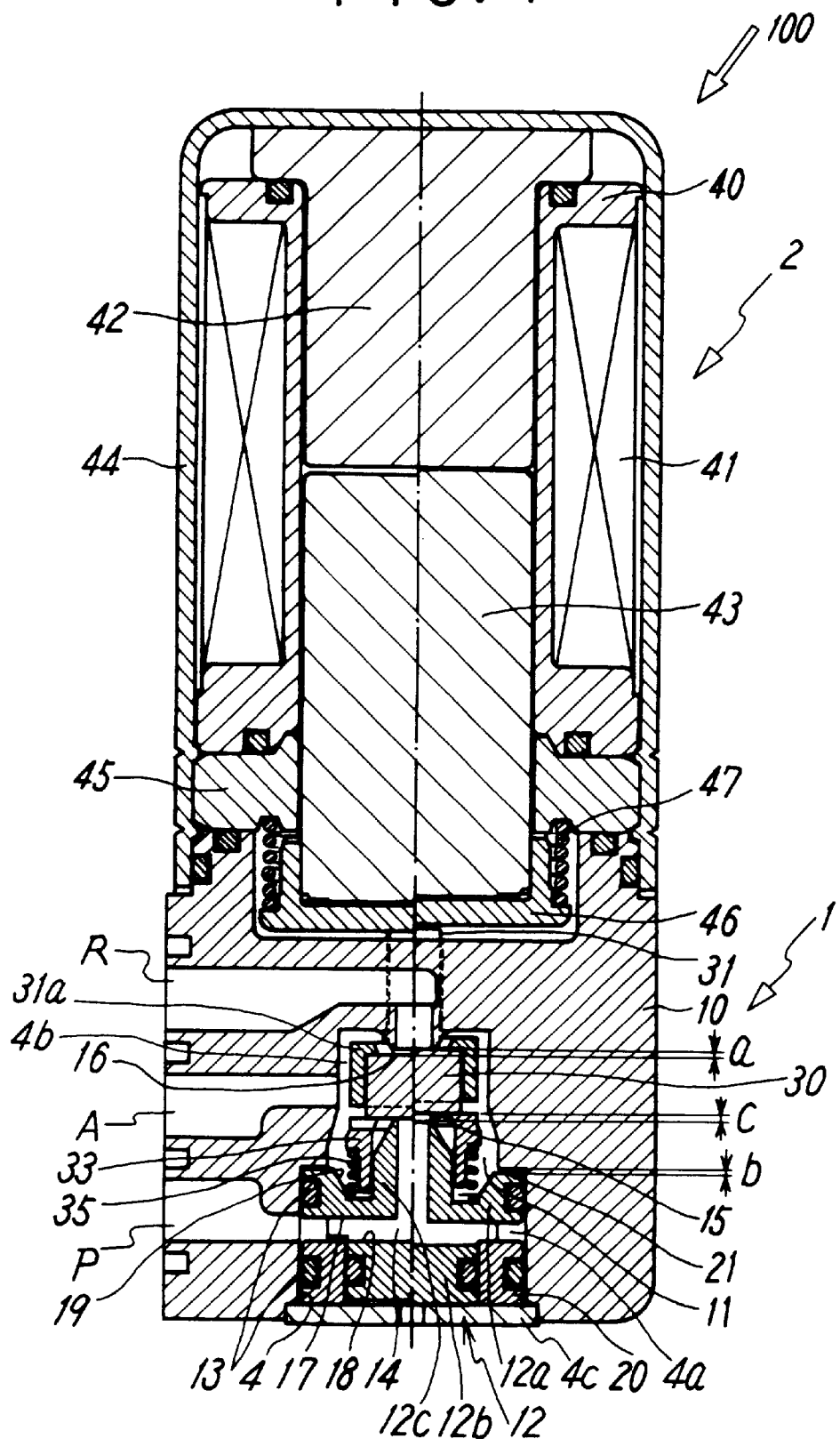
FIG. 1 is a vertical sectional view of a first embodiment of a solenoid valve according to the present invention in which a left half shows a state in which a solenoid portion is not energized and a right half shows a state in which the solenoid portion is energized.

FIG. 1 shows a first embodiment of a poppet-type solenoid valve according to the present invention. The solenoid valve 100 includes a valve portion 1 having a structure as a three-port valve and a solenoid portion 2 for driving the valve portion 1 in brief.

A housing 10 in the valve portion 1 includes an input port P, an output port A, a discharge port R, and inner holes 4 with which the respective ports communicate. The inner hole 4 is formed of a large-diameter hole portion 4a having a side face in which the input port P opens and a small-diameter hole portion 4b having a side face in which the output port A opens and an axial end portion in which the discharge port R opens through a discharge valve seat 16. A valve seat body 12 is housed in the large-diameter hole portion 4a for sliding in an axial direction and the valve seat body 12 defines a valve chamber 11 in a position of the small-diameter hole portion 4b.

The valve seat body 12 is formed of a large-diameter portion 12a for airtightly sliding by a sealing member 13 in the large-diameter hole portion 4a and a small-diameter portion 12b for airtightly sliding by a sealing member 13 in a small-diameter sleeve 20 provided to an end portion of the large-diameter hole portion 4a. The large-diameter portion 12a is formed with a supply valve seat 15 opening into the valve chamber 11 at a tip end of a tube portion 12c formed at a center of the large-diameter portion 12a such that the supply valve seat 15 faces the discharge valve seat 16. At a boundary between the large-diameter portion 12a and the small-diameter portion 12b, a space portion 14 communicating with the input port P is formed. A first pressure receiving face 17 on the large-diameter portion 12a side and a second pressure receiving face 18 on the small-diameter portion 12b side having different pressure receiving areas are formed respectively to face each other on opposite faces of the space portion 14 which also functions as a flow path. On a side of the large-diameter portion 12a facing the valve chamber 11, a third pressure receiving face 19 having substantially the same area as the first pressure receiving face 17 is formed.

The space portion 14 is connected to the valve chamber 11 by a through hole extending in the tube portion 12c through the supply valve seat 15 and a poppet valve body 30 for opening and closing the supply valve seat 15 and the discharge valve seat 16 is disposed in the valve chamber 11. A plate 4c for fixing the sleeve 20 is mounted to an end portion of the large-diameter hole portion 4a and a hole for opening a chamber behind the small-diameter portion 12b to an outside is provided to the plate 4c.

The valve seat body 12 moves forward and rearward in the inner hole 4 by fluid pressure of compressed air or the like supplied from the input port P. In other words, in a state in which the supply valve seat 15 is closed with the poppet valve body 30 as shown in a left half part of the drawing, if fluid pressure supplied into the space portion 14 from the input port P acts on the first pressure receiving face 17 having a large area and the second pressure receiving face having a small area, the valve seat body 12 moves forward to a position where the large-diameter portion 12a comes in contact with a step portion 21 of the inner hole 4 by a fluid pressure operating force based on a difference between the areas. At this time, the poppet valve body 30 opens the discharge valve seat 16 by a stroke a. In a state in which the supply valve seat 15 is open and the fluid pressure from the input port P flows into the valve chamber 11 as shown in a right half part of the drawing, because the fluid pressure in the valve chamber 11 also acts on the third pressure receiving face 19 of the valve seat body 12, the valve seat body 12 is pushed downward by a driving force according to a total area difference between the respective pressure receiving faces 17 to 19, i.e., a driving force of a magnitude corresponding to a diameter of the small diameter portion 12b and moves rearward to a position where the small diameter portion 12b is locked to the sleeve 20. A stroke of the valve seat body 12 is b at this time and a stroke by which the poppet valve body 30 eventually opens the supply valve seat 15 is c=a+b.

The poppet valve body 30 is disposed between the supply valve seat 15 and the discharge valve seat 16 and opens and closes the valve seats 15 and 16 by energization and cancellation of energization of the solenoid portion 2. In order to cause the poppet valve body 30 to carry out opening and closing operations by the solenoid portion 2, the poppet valve body 30 is provided with push rods 31, 31 integral with a cover 31a attached to an outer peripheral portion of the poppet valve body 30. These push rods 31, 31 are led out from the housing 10 toward the solenoid portion 2 in a position astride the discharge valve seat 16 and tip ends of the push rods 31, 31 are brought into contact with a cap 46 attached to a movable core 43 of the solenoid portion 2.

The supply valve seat 15 is provided to a tip end of the tube portion 12c extending forward from the central portion of the valve seat body 12. A tubular spring guide 33 having a tip end in contact with the poppet valve body 30 is fitted for sliding over a periphery of the tube portion 12c and a poppet spring 35 is provided between the spring guide 33 and the valve seat body 12. A groove through which fluid can flow is formed at a portion of the tip end of the spring guide 33 in contact with the poppet valve body 30 and a flow path between the supply valve seat 15 and the output port A is obtained by the groove. A repulsing force of the poppet spring 35 does not exceed the fluid pressure operating force acting on the valve seat body 12 due to the area difference between the first pressure receiving face 17 and the second pressure receiving face 18.

The solenoid portion 2 is formed by fixing a fixed core 42 in a bobbin 40 wound with a coil 41, fitting the movable core 43 attracted by the fixed core 42 in the bobbin 40 for sliding, and forming a magnetic path with a magnetic cover 44 and a magnetic plate 45 surrounding a periphery of the coil 41. The cap 46 made of synthetic resin is attached to the movable core 43 and a return spring 47 is provided in a contracted state between the cap 46 and the magnetic plate 45.

In the poppet-type solenoid valve 100 having the above structure, when the solenoid portion 2 is not energized, because the poppet valve body 30 is pressed by a biasing force of the return spring 47 through the cap 46 attached to the movable core 43 and the push rods 31, the discharge valve seat 16 is open and the supply valve seat 15 is closed as shown in the left half part of FIG. 1. Therefore, the output port A is open to the atmosphere through the discharge port R. In this case, pressure of fluid flowing from the input port P into the space portion 14 of the valve seat body 12 acts in opposite directions on the first pressure receiving face 17 and the second pressure receiving face 18. Because the area of the first pressure receiving face 17 is larger than that of the second pressure receiving face 18, the valve seat body 12 is moved forward by the fluid pressure operating force based on the area difference and stops in such a position as to come in contact with the step portion 21. The opening stroke of the discharge valve seat 16 by the pilot valve body 30 at this time is a.

If the solenoid portion 2 is energized in this state, because the movable core 43 is attracted by the fixed core 42, the poppet valve body 30 moves by the stroke a to open the supply valve seat 15 and to close the discharge valve seat 16 as shown in the right half of FIG. 1. Therefore, the pressure fluid flows from the supply valve seat 15 into the valve chamber 11 and flows to the output port A. Then, the fluid pressure in the valve chamber 11 also acts on the third pressure receiving face 19 of the valve seat body 12 and the fluid pressure operating forces acting on the third pressure receiving face 19 and the first pressure receiving face 17 cancel out each other. As a result, the valve seat body 12 is pushed downward by the fluid pressure operating force acting on the second pressure receiving face 18, i.e., the driving force of the magnitude corresponding to the diameter of the small diameter portion 12b and moves rearward by the stroke b to the position where the small diameter portion 12b is locked to the sleeve 20. Thus, the supply valve seat 15 is eventually opened by the poppet valve body 30 by the stroke c=a+b.

Thus, because the movable core 43 is required to be attracted by the fixed core by only a small distance of the stroke a to open the poppet valve body 30 by the stroke c=a+b in the solenoid portion 2, the movable core 43 can be reliably attracted with an extremely large attracting force or it is possible to generate a large attracting force required for valve opening with a small-sized solenoid and to easily open the supply valve seat 15. Although the attracted stroke a of the movable core 43 is small, it is possible to open the poppet valve body 30 by up to the stroke c=a+b. Therefore, it is possible to switch a large flow rate of fluid by the small stroke.

Next, if energization of the solenoid portion 2 is cancelled, the movable core 43 returns by the biasing force of the return spring 47 and the poppet valve body 30 opens the discharge valve seat 16, closes the supply valve seat 15, and opens the output port A and the valve chamber 11 to the atmosphere. At this time, the poppet valve body 30 moves by the stroke c and the discharge port R also opens temporarily by the stoke c. Then, if the fluid pressure in the valve chamber 11 reduces, the valve seat body 12 moves forward toward the poppet valve body 30 by the stroke b by the fluid pressure operating force based on the area difference between the first pressure receiving face 17 and the second pressure receiving face 18 and comes in contact with the step portion 21. As a result, the poppet valve body 30 and the movable core 43 move rearward by the stroke b, eventually stop in such positions shown in the left half part of FIG. 1 as to open the discharge valve seat 16 by the stroke a, and occupy such positions as to open the discharge valve seat 16 by a small stroke.

Thus, according to the solenoid valve 100, it is possible to open the valve seat by as large an amount as possible to obtain a large flow rate while reducing the stroke of the movable core 43 in the solenoid portion 2 to obtain the large attracting force with the smallest possible solenoid and the smallest possible power.

Figure 2:
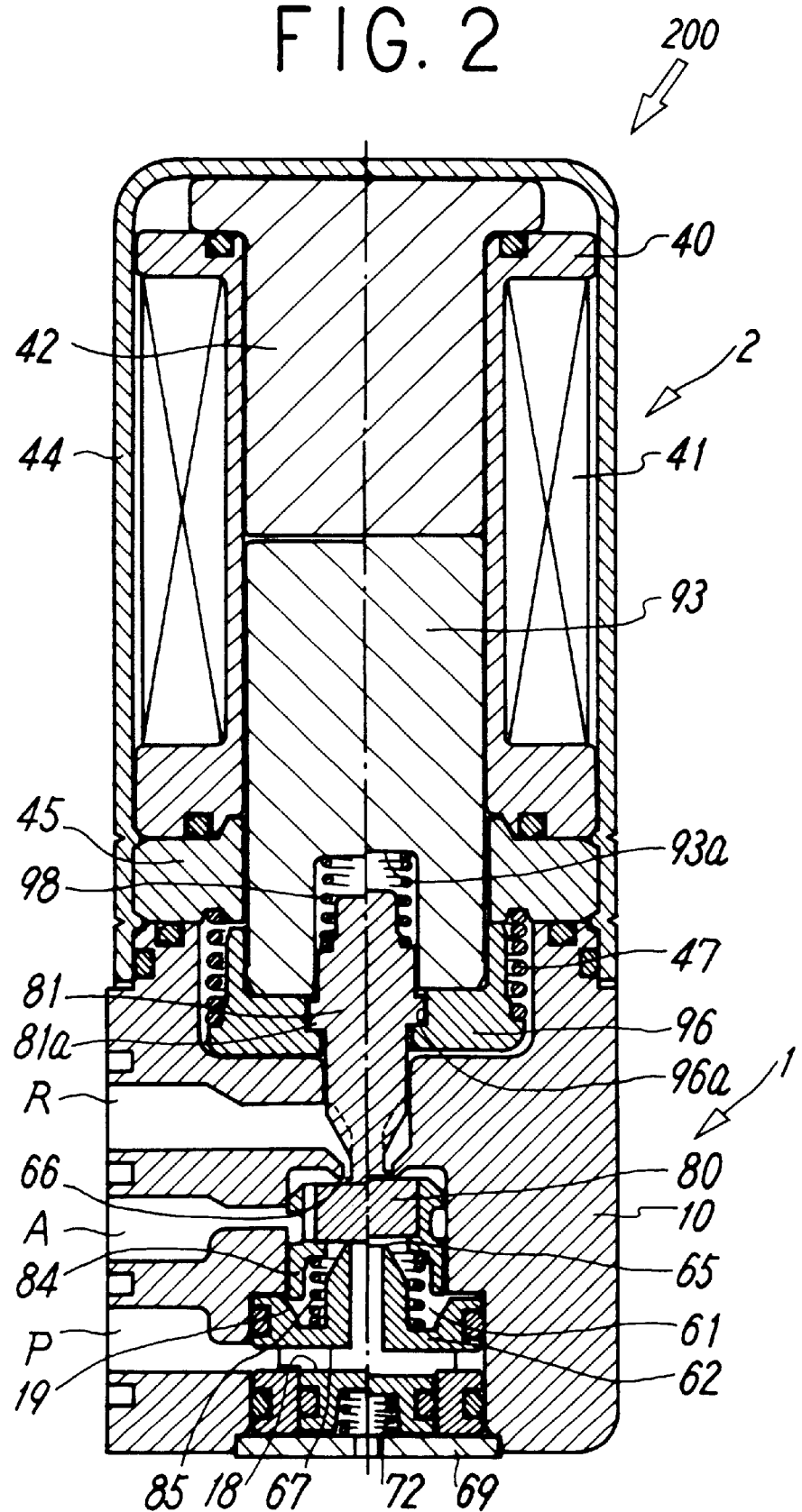
FIG. 2 is a vertical sectional view of a second embodiment of a solenoid valve according to the invention in which a left half shows a state in which a solenoid portion is not energized and a right half shows a state in which the solenoid portion is energized similarly to FIG. 1.

FIG. 2 shows a second embodiment of the poppet-type solenoid valve according to the invention. In the solenoid valve 200, a poppet valve body 80 disposed between a supply valve seat 56 and a discharge valve seat 66 is opened and closed by pressing the poppet valve body 80 with a push rod 81 extending from a movable core 93 of a solenoid portion 2 through an inside of the discharge valve seat 66. The push rod 81 has a base end fitted in a recessed portion 93a provided to the movable core 93 and is repulsed toward the poppet valve body 80 by a bias spring 98. By restricting a stroke of the push rod 81, a flange-shaped projection 81a provided to an outer periphery of the push rod 81 is fitted in a recessed portion 96a of a cap 96 attached to the movable core 93.

A poppet guide 84 for sliding in a valve chamber 61 is mounted to the poppet valve body 80 instead of a spring guide 33 in the first embodiment and a poppet spring 85 is mounted between the poppet guide 84 and a valve seat body 62. A flowing gap for fluid is provided to a periphery of the poppet guide 84 to obtain a flow path extending from the supply valve seat 65 to an output port A and a flow path extending from the output port A to the discharge valve seat 66.

Furthermore, an assist spring 72 for repulsing the valve seat body 62 toward the discharge valve seat 66 is provided between the valve seat body 62 and a plate 69. The assist spring 72 assists a fluid pressure operating force acting on a first pressure receiving face 67 to push the valve seat body 62 against the poppet valve body 80. The assist spring 72 can also be provided to the valve seat body 12 in the solenoid valve of the first embodiment.

Because there is no difference between other structures and operations of the second embodiment and those of the first embodiment, main portions in the drawing are provided with reference numerals similar to those of the first embodiment to omit descriptions of the portions.

According to the poppet-type solenoid valve of the invention described above in detail, it is possible to provide a solenoid valve in which the valve seat is opened by as large an amount as possible to obtain a large flow rate while reducing a stroke of the movable core in the solenoid portion to obtain a large attracting force with the smallest possible solenoid and the smallest possible power.

What is claimed is:

1. A poppet-type solenoid valve comprising: a housing including an input port, an output port, and a discharge port; a valve chamber which is formed in said housing, with which said input port and said discharge port respectively communicate through a supply valve seat and a discharge valve seat facing each other, and with which said output port communicates in a position between both said valve seats; a poppet valve body disposed in said valve chamber to open and close said supply valve seat and said discharge valve seat; and a solenoid portion including a movable core for causing said poppet valve body to carry out opening and closing operations, wherein said supply valve seat is formed on a valve seat body which is disposed for moving forward and rearward in such directions as to approach and move away from said discharge valve seat and which defines said valve chamber, said valve seat body includes a supply flow path connecting said input port and said supply valve seat, first and second pressure receiving faces which have different pressure receiving areas and on which fluid pressure from said input port acts in opposite directions, and a third pressure receiving face on which fluid pressure in said valve chamber acts in the same direction as on said second pressure receiving face, said valve seat body moves forward in such a direction as to approach said discharge valve seat due to a fluid pressure operating force based on an area difference between said first and second pressure receiving faces when said supply valve seat is closed with said poppet valve body and moves rearward in such a direction as to move away from said discharge valve seat due to a fluid pressure operating force based on an area difference between said respective pressure receiving faces when said poppet valve body opens said supply valve seat.

2. A poppet-type solenoid valve according to claim 1, wherein said valve seat body has a large-diameter portion and a small-diameter portion, said supply valve seat is formed and said third pressure receiving face facing said valve chamber is formed at said large-diameter portion, a space portion also functioning as a part of said supply flow path is formed between said large-diameter portion and said small-diameter portion, said first pressure receiving face is formed on a face on a side of said large-diameter portion facing said space portion, and said second pressure receiving face is formed on a face on a side of said small-diameter portion facing said space portion.

3. A poppet-type solenoid valve according to claim 2, wherein said large-diameter portion of said valve seat body is fitted in an inner hole formed in said housing through a sealing member and said small-diameter portion of said valve seat body is fitted for sliding through a sealing member in a small-diameter sleeve mounted in said inner hole.

4. A poppet-type solenoid valve according to claim 1 further comprising an assist spring for repulsing said valve seat body toward said discharge valve seat in an assisting manner.

5. A poppet-type solenoid valve according to claim 1, wherein a spring guide in contact with said poppet valve body is movably provided around said supply valve seat in said valve seat body and a poppet spring is provided between said spring guide and said valve seat body.

6. A poppet-type solenoid valve according to claim 1, wherein a poppet guide for guiding opening and closing of said poppet valve body by sliding in said valve chamber is mounted to said poppet valve body and a poppet spring is disposed between said poppet guide and said valve seat body.

* * * * *